July 3, 1956　　　J. J. MARTIN ET AL　　　2,752,823
DIRIGIBLE SPOT LAMP AND MIRROR
Filed Oct. 1, 1954
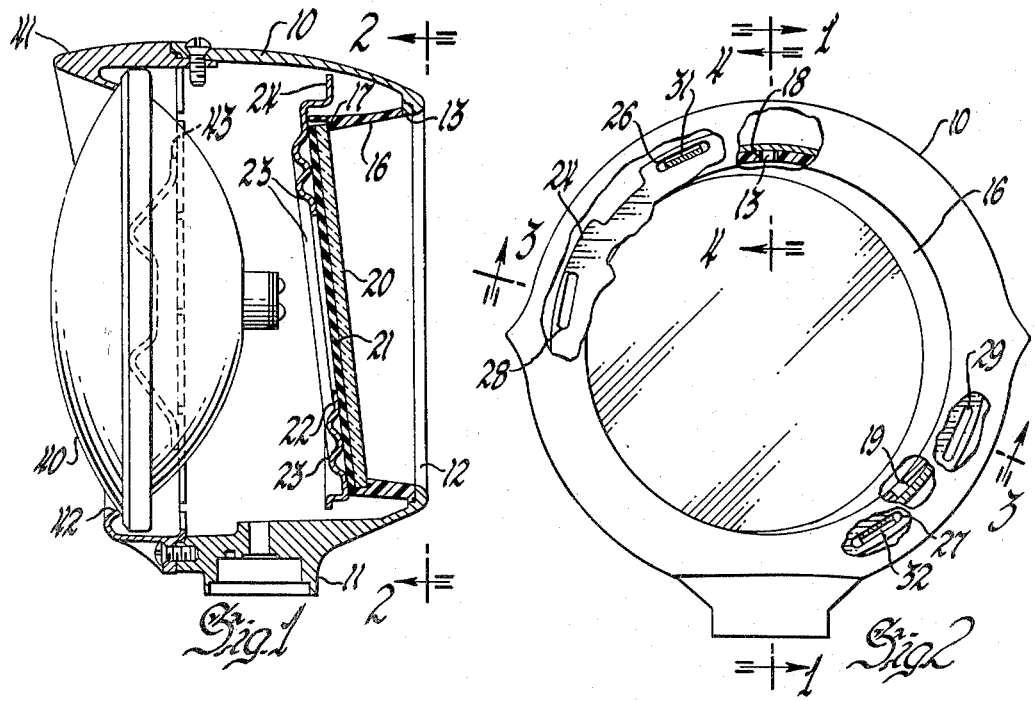
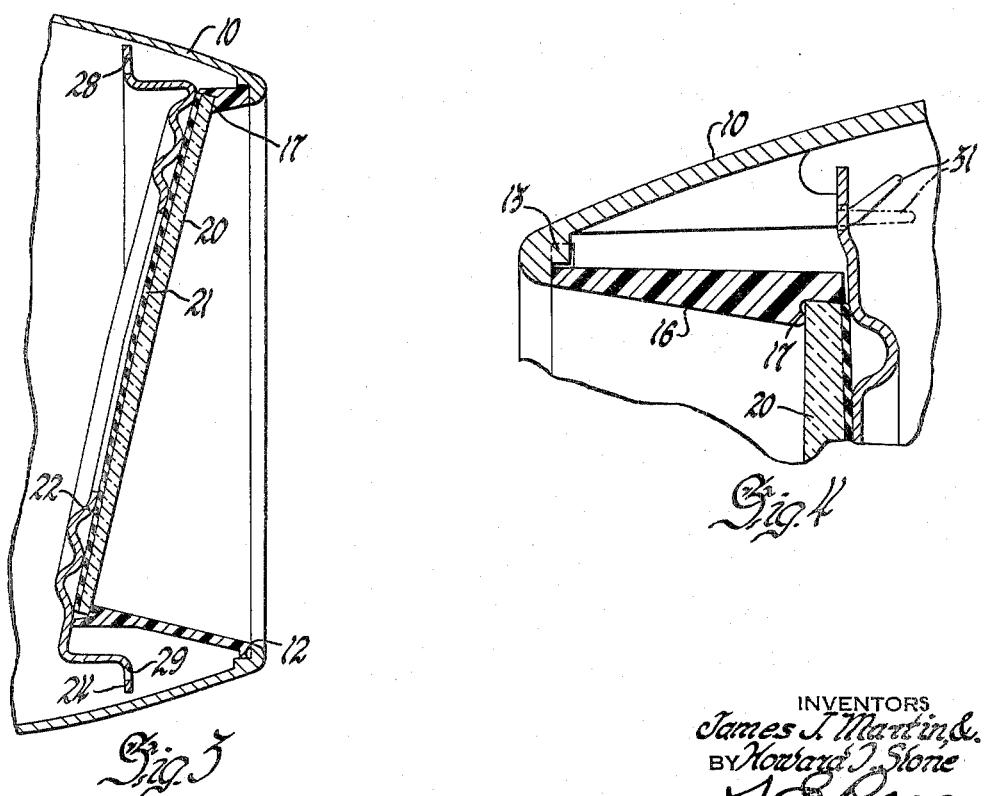
INVENTORS
James J. Martin &
By Howard J. Stone
J. E. Ross
ATTORNEY United States Patent Office 2,752,823
Patented July 3, 1956

2,752,823

DIRIGIBLE SPOT LAMP AND MIRROR

James J. Martin, Chesterfield, and Howard I. Slone, Alexandria, Ind., assignors to General Motors Corporation, Detroit, Mich., a corporation of Delaware Application October 1, 1954, Serial No. 459,583

6 Claims. (Cl. 88—98)

This invention relates to spotlamps of the type combined with rear view mirrors; more particularly, it relates to a mirror supporting structure for a spotlamp housing which may be dirigibly mounted on a vehicle body.

Certain advantages are realized by utilizing a combined spotlamp and mirror mounting structure. For example, the combined mounting of a spotlamp and mirror on the body of a vehicle reduces the obstruction to the field of vision of the operator. Additionally, the combined mounting requires only a single support extending from the vehicle body. In certain prior constructions an adjustable mounting for the mirror on the lamp housing is provided by a ball and socket joint or the like. This permits relative movement between the mirror and lamp housing and a wide range of adjustment. However, the mirror protruding from the housing in such construction, presents an unsightly assembly and increases the obstruction to the operator's view.

It is known in the prior art to attach the mirror to the rear portion of a lamp housing in fixed relation and to use the lamp remote control mechanism for positioning the mirror. This latter construction eliminates the protruding mirror assembly and thus reduces the obstruction to the operator's view. Furthermore, it permits the lamp housing and mirror to be constructed with an integral design of more pleasing appearance.

A difficulty with this prior art arrangement is that it is not well adapted for mounting of the assembly on either side of the vehicle body. This arises because the fixed relation between the mirror and the lamp housing determines the angular inclination of the mirror for a given orientation of the spotlamp. Obviously, it is desirable to maintain the spotlamp in a straight ahead or reference position in parallel alignment with the vehicle body. The inclination of the mirror may be suitably fixed for use on one side of the vehicle body for this reference position to provide the operator with the desired field of view to the rear. Only a minimum amount of adjustment is then required to account for the operator's individual characteristics. However, if the assembly were to be mounted on the other side of the vehicle with this same inclination, the field of view afforded the operator would be far displaced from that normally desired for vehicle operation. This would require a large amount of adjustment of the lamp and mirror assembly away from the reference position to provide the operator with the desired rear view. It will be appreciated that extensive displacement of the lamp and mirror assembly from the reference position for normal use of the rear vision mirror is quite undesirable from the standpoint of styling of the vehicle and lamp housing. It is desirable to harmonize the styling of an accessory with the vehicle and where the accessory is movable, it should be displaced from its reference position only upon occasional use.

It is the object of this invention, therefore, to obviate the disadvantages of the prior art by providing a spotlamp housing incorporating a mirror support structure adapting the assembly for mounting on either side of the vehicle body with the assembly in the straight-ahead position for normal use of the mirror.

It is a further object to provide a combined spotlamp and rear view mirror in which the support structure for the mirror is totally enclosed and concealed.

It is an additional object of this invention to provide a combined spotlamp and mirror which has like reference positions with respect to the vehicle body regardless of the side on which the combination is mounted, while providing the operator with the desired rear field of view with only minor adjustments of the assembly from the reference position.

It is a further object to provide a spotlamp and mirror construction which presents a minimum of obstruction to the field of vision of the operator of the vehicle.

Another object is to provide a spotlamp housing incorporating a rear vision mirror support within the housing permitting the greatest freedom in aesthetic design so that the styling may harmonize with that of the vehicle.

These and other objects and the manner in which they are accomplished will appear from the description which follows taken in conjunction with the accompanying drawing in which:

Fig. 1 is a side elevation view in section of the inventive assembly.

Fig. 2 is a rear elevation in partial section taken on line 2—2 of Fig. 1.

Fig. 3 is an enlarged fragmentary sectional view taken on line 3—3 of Fig. 2 showing certain details of the construction.

Fig. 4 is an enlarged sectional view taken on line 4—4 of Fig. 2 showing additional details.

Briefly, this invention resides in a spotlamp incorporating an adjustable mirror support adapting the assembly for mounting on either side of a vehicle body. The rear portion of the lamp housing is provided with an opening and supports a bezel, the inner end of which is truncated obliquely and supports a rear vision mirror. Rotation of the bezel around its longitudinal axis adjusts the mirror inclination with respect to the housing and includes two reference positions; one for use on each side of the vehicle.

Referring now to the drawings, there is shown in Fig. 1 a lamp housing which is generally cylindrical and is provided with an outer surface of uninterrupted configuration. The housing 10 may be formed of diecast metal and is provided with an integral base portion including a boss 11 which is provided with shouldered recesses, defining a transverse axis of the lamp housing. The boss 11 is adapted to receive a supporting structure (not shown) which extends from the vehicle body and which houses the remote control mechanism for positioning the lamp housing. The inventive assembly is adapted to be used with any suitable support arm and control mechanism such as that described in the U. S. Patent to Falge 2,623,986.

The lamp housing 10 terminates at its rearward extremity in an inwardly extending annular shoulder 12. The shoulder 12 is provided on its periphery with orienting means or key 13. A substantially cylindrical bezel 16, suitably of plastic material, has one end seated against the shoulder 12 and it is provided at this end with spaced orienting means or recesses 18 and 19, either of which may be interlocked with the key 13 for purposes which will appear subsequently. The bezel 16 is generally coaxial with the housing 10 and at its inner end is truncated obliquely with respect to the bezel axis. This end of the bezel is provided with a shouldered portion 17 for supporting a mirror 20. The mirror is retained in the bezel by virtue of the shoulder 17 and a back plate 22 which is secured to the housing. Interposed between the back plate and the mirror is a pad 21 of sponge rubber or any other suitable material engaging that portion of the back plate which lies parallel to the plane of the mirror. The central portion of the back plate is provided with reinforcing ribs 23. A rim portion 24 defines a plane perpendicular to the longitudinal axis of the housing and includes a first pair of diametrically opposite slots 26 and 27 and the second pair of diametrically opposite slots 28 and 29. In the assembled relation shown on Figure 2, the slots 26 and 27 are in registry with releasable securing means or tangs 31 and 32 respectively, which may be formed integrally with the housing 10. If desired, the securing means may take the form of screw threaded fasteners or other suitable means.

It will be noted that the pair of slots 26 and 27 are angularly displaced from the pair of slots 28 and 29 by an angle equal to the displacement between the recesses 18 and 19 in the bezel 16. This permits the bezel and mirror supporting assembly to be rotated about the longitudinal axis of the housing between first and second reference positions defined by the registry of the stop means. With the assembly in either of the two positions, the key 13 and the recess 18 or 19 serve as locating means for the bezel while the tangs 31 and 32 extending through the corresponding slots, may be bent laterally to restrain the assembly from axial motion. Since the mirror is supported on the bezel obliquely with respect to the longitudinal axis of the housing, rotation of the bezel and mirror assembly changes the angular inclination of the plane of the mirror with respect to the longitudinal and transverse axes.

At the forward end of the lamp housing, a directive lamp 40 is mounted with its directive axis coincident with the longitudinal axis of the housing 10. A closure member is formed with inwardly directed flange 42, which engages the lamp lens or body for retaining the lamp in position. The closure member 41 is suitably secured to the lamp housing 10 by screw-threaded fasteners and is designed to conform to the configuration of the housing. A retaining spring 43, is seated against a projection on the closure member 41 and bears against the lamp body to resiliently urge the lamp into engagement with the flange 42.

Assembly of the device is effected with the closure member and lamp removed and thus access is provided for rotatively positioning the bezel and the mirror. For mounting of the spotlamp and mirror on the left-hand side of the vehicle, the bezel is seated against the shoulder 12 with the recess 18 in registry with the key 13. The mirror assembly including the back plate 24, is positioned with the slots 26 and 27 in alignment with tangs 31 and 32. In this rotative position of the bezel, the plane of the mirror is displaced angularly from the transverse and longitudinal axes of the housing. With the lamp and housing directed straight-ahead with respect to the vehicle, the inclination of the mirror is such that the field to the rear of the vehicle is reflected to an observer viewing from a position to the right of and somewhat above the lamp and mirror housing. Slight adjustment may be necessary with the remote control mechanism to adjust the field of vision to the individual characteristics of the operator. Only occasional displacement of lamp and mirror housing from this straight-ahead position will be required; such as, during operation of the spotlamp.

For mounting of the assembly on the right-hand side of the vehicle, the bezel 16 and mirror assembly are rotated to a position in which key 13 registers with recess 19, and the tangs 31 and 32 register respectively with slots 28 and 29. In this rotative position, the plane of the mirror is angularly displaced from the transverse axis by substantially the same angle as for the left-hand mounting. The plane of the mirror is displaced from the longitudinal axis an amount sufficient to provide the desired rear field of view with the lamp and mirror housing in the straight-ahead position.

It will be appreciated that the optimum angle at which the bezel is truncated will depend upon the type of installation in which the invention is to be used. Among the numerous factors to be considered are the type of vehicle, the mounting location on the vehicle, the position of the operator, and the desired reflected field of vision. In a typical installation on a conventional passenger automobile it has been found that an angle of approximately 17 degrees between the plane of truncation and a plane perpendicular to the bezel axis, as viewed in a horizontal plane, is quite satisfactory. In this case the angular displacement of the bezel between the reference positions for right-hand and left-hand mounting is approximately 135 degrees.

This invention has been described with respect to a particular embodiment which is illustrative only and is not to be construed in a limiting sense upon the scope of the invention. Numerous modifications will occur to those skilled in the art. For a definition of the invention reference is made to the appended claims.

We claim:

1. A dirigibly mounted lamp housing and rear vision mirror adapted to be mounted on either side of a vehicle body, said housing defining longitudinal and transverse axes and including an annular shoulder at its rearward extremity; a substantially cylindrical bezel coaxial with said housing and having one end engaging said shoulder for rotation thereon about said longitudinal axis, the other end of said bezel being truncated obliquely, a mirror supported on said other end for rotation with said bezel between first and second positions, stop means for retaining said bezel in said first and second positions, said mirror having one angular inclination with respect to said axes in said first position for mounting of said housing on one side of said body and another angular inclination in said second position for mounting of said housing on the other side of said body.

2. A dirigibly mounted lamp housing and rear vision mirror adapted to be mounted on either side of a vehicle body, said housing defining longitudinal and transverse axes and including an annular shoulder at its rearward extremity; a substantially cylindrical bezel coaxial with said housing and having one end seated against said shoulder for rotation thereon, the other end of said bezel being obliquely truncated, a mirror supported on said other end, a support plate having a portion adjacent and parallel to said mirror and a rim portion defining a plane perpendicular to said longitudinal axis, the assembly of said bezel, said mirror and said support plate being rotatable between first and second positions, and releasable securing means on said housing and said rim portion for retaining said assembly in a selected position, said mirror having one angular inclination with respect to said axes in said first position for mounting of said housing on one side of said body and a different angular inclination in said second position for mounting of said housing on the other side of said body.

3. In combination, a dirigibly mounted lamp and rear vision mirror housing defining a longitudinal axis, said housing being generally cylindrical and having a reference position, a directive lamp supported interiorly of the forward end of said housing in alignment with said lonitudinal axis, a generally cylindrical bezel supported interiorly of the rearward end of said housing in alignment with said longitudinal axis, the inner end of said bezel being truncated obliquely, a mirror supported on said inner end, said bezel being rotatable about said axis, whereby a reflected field from said mirror may be selected which extends in the direction of the axis of said lamp when said housing is in its reference position.

4. A dirigibly mounted lamp housing and rear vision mirror adapted to be mounted on either side of a vehicle body, said housing defining longitudinal and transverse axes and including an annular shoulder at its rearward extremity, a substantially cylindrical bezel coaxial with said housing and having one end engaging said shoulder for rotation thereon about said longitudinal axis, the other end of said bezel being truncated obliquely, a mirror supported on said other end for rotation with said bezel between first and second positions, a support plate overlying the back of said mirror, releasable securing means extending from said housing into engagement with said plate, stop means on said shoulder and said bezel for retaining said bezel in said first and second positions, said mirror having one angular inclination with respect to said axes in said first position for mounting of said housing on one side of said body and another angular inclination in said second position for mounting of said housing on the other side of said body.

5. A dirigibly mounted lamp housing and rear vision mirror adapted to be mounted on either side of a vehicle body, said housing being generally cylindrical, defining a longitudinal axis and having an uninterrupted outer surface configuration, said housing terminating at one end in an inwardly directed annular flange, a substantially cylindrical bezel coaxial with said housing having one end seated against said flange for rotation thereon about said longitudinal axis, the other end of said bezel being truncated obliquely, a mirror supported on the said other end of said bezel for rotation therewith between first and second positions, stop means on said bezel and said flange for retaining said bezel in a selected position, said housing including a mounting boss defining a transverse axis, and a closure at the other end of said housing, said mirror having one angular inclination with respect to said axes in said first position for mounting of said housing on one side of said body and another angular inclination in said second position for mounting of said housing on the other side of said body.

6. In combination, a dirigibly mounted lamp and rear vision mirror housing defining a longitudinal axis, said housing having a reference position and being generally cylindrical with an outer surface of uninterrupted configuration, said housing terminating at its rear end in an inwardly directed annular flange, a generally cylindrical bezel supported interiorly of said housing in alignment with said longitudinal axis and having one of its ends seated against said flange, the other of its ends being obliquely truncated, a mirror supported on the truncated end of said bezel, a directive lamp supported interiorly of the forward end of said housing, retaining means for said lamp secured to said housing and constituting a closure for said housing, said bezel being rotatable about said axis whereby the reflected field from said mirror extends in the desired direction when said housing is in its reference position.

References Cited in the file of this patent

UNITED STATES PATENTS

| | | |
|---|---|---|
| 1,278,741 | Phelps | Sept. 10, 1918 |
| 2,457,348 | Chambers | Dec. 28, 1948 |
| 2,511,971 | Dalton | June 20, 1950 |